US012275265B2

(12) United States Patent
Dehmel et al.

(10) Patent No.: US 12,275,265 B2
(45) Date of Patent: Apr. 15, 2025

(54) SECURITY ELEMENT

(71) Applicants: Giesecke+Devrient Currency Technology GmbH, Munich (DE); SICPA HOLDING SA, Prilly (CH)

(72) Inventors: Raphael Dehmel, Neubeuern (DE); Yana Kisselova-Weckerle, Ottobrunn (DE); Christoph Mengel, Holzkirchen (DE); Christian Fuhse, Otterfing (DE); Pierre Degott, Mollie-Margot (CH); Claude-Alain Despland, Bussigny (CH); Arnault Weber, Lausanne (CH); Gisele Baudin, Cugy (CH); Andrea Callegari, Ecublens (CH)

(73) Assignees: GIESECKE+DEVRIENT CURRENCY TECHNOLOGY GMBH, Munich (DE); SICPA HOLDING SA, Prilly (CH)

( * ) Notice: Subject to any disclaimer, the term of this patent is extended or adjusted under 35 U.S.C. 154(b) by 0 days.

(21) Appl. No.: 17/627,761

(22) PCT Filed: Jul. 14, 2020

(86) PCT No.: PCT/EP2020/069859
§ 371 (c)(1),
(2) Date: Jan. 17, 2022

(87) PCT Pub. No.: WO2021/009162
PCT Pub. Date: Jan. 21, 2021

(65) Prior Publication Data

US 2022/0266621 A1 Aug. 25, 2022

(30) Foreign Application Priority Data

Jul. 15, 2019 (EP) .................................... 19186381

(51) Int. Cl.
*B42D 25/324* (2014.01)
*B42D 25/369* (2014.01)
*B42D 25/29* (2014.01)

(52) U.S. Cl.
CPC ......... *B42D 25/324* (2014.10); *B42D 25/369* (2014.10); *B42D 25/29* (2014.10)

(58) Field of Classification Search
CPC .................................................... B42D 25/324
See application file for complete search history.

(56) References Cited

U.S. PATENT DOCUMENTS

2008/0258456 A1 10/2008 Rahm et al.
2012/0268598 A1 10/2012 Holmes et al.
(Continued)

FOREIGN PATENT DOCUMENTS

AU 2014356874 A1 6/2016
AU 2017276507 A1 1/2019
(Continued)

OTHER PUBLICATIONS

International Search Report (PCT ISA 210) and Written Opinion (PCT ISA 237) mailed Sep. 28, 2020 (10 pgs.).
Indian Examination Report for Application No. 202137057219, mailed Jun. 18, 2024 (7 pgs.).

*Primary Examiner* — Kyle R Grabowski
(74) *Attorney, Agent, or Firm* — Bradley J. Thorson; DeWitt LLP

(57) ABSTRACT

It is disclosed a security element comprising a substantially flat substrate including first and second areas, wherein the first area displays a first motif and generates a first color movement effect to be seen in the first motif while the substrate gets tilted over a first angular tilting range, the second area displays a second motif and generates a second color effect to be seen in the second motif and within a second angular tilting range, the first and second angular
(Continued)

tilting ranges are different, and the first area comprises either a micro-mirror structure or a print of magnetically oriented pigments and the second area comprises the other one of the micro-mirror structure and the print of magnetically oriented pigments.

18 Claims, 4 Drawing Sheets

(56) References Cited

U.S. PATENT DOCUMENTS

| | | | | |
|---|---|---|---|---|
| 2012/0319395 | A1 | 12/2012 | Fuhse et al. | |
| 2013/0208327 | A1 | 8/2013 | Bolle et al. | |
| 2016/0023495 | A1 | 1/2016 | Fuhse et al. | |
| 2018/0111406 | A1* | 4/2018 | Loginov | H01F 41/16 |

FOREIGN PATENT DOCUMENTS

| | | | | |
|---|---|---|---|---|
| AU | 2014356874 | B2 * | 6/2019 | B42D 25/324 |
| CA | 2761779 | A1 | 9/2010 | |
| DE | 102005061749 | A1 * | 7/2007 | B42D 25/324 |
| DE | 102010047250 | A1 | 6/2011 | |
| DE | 102013002137 | A1 | 8/2014 | |
| DE | 102013019944 | A1 | 5/2015 | |
| DE | 102016007064 | A1 | 12/2017 | |
| EP | 3406458 | A1 * | 11/2018 | B42D 25/324 |
| RU | 2719319 | C1 * | 4/2020 | B42D 25/29 |
| WO | 2010100360 | A1 | 9/2010 | |
| WO | 2011051668 | A1 | 5/2011 | |
| WO | 2015078572 | A1 | 6/2015 | |
| WO | WO-2016177470 | A1 * | 11/2016 | B42D 25/324 |
| WO | WO-2017211450 | A1 * | 12/2017 | B42D 25/324 |
| WO | WO-2019057327 | A1 * | 3/2019 | B42D 25/324 |

* cited by examiner

SECURITY ELEMENT

RELATED APPLICATIONS

The present application claims priority to PCT Application No. PCT/EP2020/069859, entitled SECURITY ELEMENT, filed Jul. 14, 2020, and claims the benefit of European Application No. 19186381.0, filed Jul. 15, 2019, which are both hereby incorporated herein by reference in their entirety.

The invention relates to a security element and to a method for manufacturing a security element for protecting documents from forgery.

WO 2010/100360 A1 discloses a security element and method of manufacturing such security element, wherein the element comprises a micro-mirror structure to generate a motif exhibiting a color shift or color to be seen in an angular tilting range, i.e. when the substantially flat substrate of the security element is tilted against the observing direction. WO 2015/078572 A1 relates to a security element generating a similar effect by complementing such micro-mirror structure by a print of magnetically oriented pigments. When the security element is tilted, both elements, i.e. the micro-mirror structure and the magnetically oriented pigments co-operate to display an image, wherein the micro-mirror structure generates one part of the image and the magnetically oriented pigments another part of the image. During the tilting, both parts of the image may change their appearance over an angular tilting range. Because two different techniques are utilized to generate the two parts of the image, protection from forgery is increased.

However, it might still be possible to imitate the effect of one of the two elements, either the magnetically oriented pigments or the micro-mirrors by a single technology, i.e. using magnetically-oriented pigments and micro-mirrors only. An observer might overlook such forgery because only one singular image is affected when the substrate is tilted.

It is, therefore, an object of the invention to increase forgery protection and to provide a prominent visual effect for a security element.

The invention is defined by the independent claims. The dependent claims relate to preferred embodiments.

The invention provides a security element comprising (at least) two areas, namely a first area and a second area, on a substantially flat substrate. The two areas could be distinct, i.e. do not overlap in some embodiments. The first area displays a first motif and generates a first color movement effect in the first motif. This color movement effect is to be seen only when the substrate gets tilted over a first angular tilting range. The second area displays a second motif and generates a second color effect in the second motif. This color effect occurs only within a second angular tilting range. The first color movement effect generated in the first motif can be seen only in the first angular tilting range, while the second color effect in the second motif can be seen only in the second angular tilting range. The two angular tilting ranges are different. Optionally, they are distinct and the second angular tilting range continues the first angular tilting range. Then, the second angular tilting range can either be a gapless continuation of the first angular tilting range or there might be an angular gap interposed between the two angular tilting ranges.

The two areas comprise micro-mirrors or magnetically oriented pigments. Each of the mirrors and pigments to be considered to constitute a facet pointing into a particular direction. If Snell's Law is fulfilled, a facet reflects light from an illumination light source towards the observer. This condition is fulfilled for each facet for a particular tilt of the substrate (or orientation of illumination light and viewing direction). If the substrate is tilted, the facets for which the mentioned reflection condition is fulfilled changes. A facet for which the reflection condition is fulfilled looks bright whereas other facets for which the condition of angle of incident illumination and angle of viewing direction are the same, is not fulfilled remain rather dark. This allows to provide the first and second areas with movement of bright spots or sub-areas upon tilting of the substrate. In connection with a color layer, this effect generates a moving colored spot which changes its color on the move. Hence, the term "color movement effect" addresses the movement and color change of colored spots or sub-areas. Movement of the bright sub-area also involves a change of color, i.e. bright sub-areas move laterally over the motif, when the substrate is tilted, while the bright spots simultaneously change their color. This is a color movement effect in the sense of this invention. It is possible to provide the facets of the sub-areas with different color properties, e.g. by a coating. The color change can also be realized by providing laterally structured overlaying color layer and/or a color-shift layer on the first and second area. With a color-shift layer, the color is not only changed by the bright spots or sub-areas moving laterally when the substrate is tilted, but also due to the effect that color-shift layers produce different colors depending on the viewing angle, i.e. the tilt. This allows for a color movement effect which is particularly prominent and could be seen easily.

The angular tilting ranges are defined by the elevations of the facets, i.e. the elevations, provided by the micro-mirrors in the micro-mirror arrangement and in the magnetically oriented pigments. Micro-mirrors are usually produced from embossing techniques which allows to control orientation and inclination, i.e. elevation, of the individual micro-mirrors with high precision. The orientation and inclination, i.e. elevation, of magnetically oriented pigments is controlled by applying a magnetic field during the production process. There are production constraints which lead to variations in the magnetic field and thus variations in the definition of the elevation of the magnetically oriented pigments. This has the result that the angular tilting range which applies to the area comprising the magnetically oriented pigments may have some tolerance. This tolerance may lead to the fact that even if it is desired to have the first and second angular tilting ranges to be distinct, i.e. to not overlap, that still some overlap occurs due to tolerances of production. In such cases it is of advantage to have an overlap of not more than 10%.

The color movement effect comprises embodiments in which a colored sub-area moves in the respective motif and changes its color in the first motif. The second area can comprise a similar color movement effect. However, it is equally possible that the second area shows a color effect without movement. In its simplest form such color effect is the occurrence of a color not be seen outside the second angular tilting range. Further, the second color effect can be a change of color while the substrate is tilted within the second angular tilting range and, of course, also a color movement effect similar or identical to that of the first area.

The angular tilting ranges relate to the color movement effect or color effect to be seen in the respective motif. This does not exclude that the motifs can be seen (of course without color movement effect and without color effect) even outside their corresponding angular tilting ranges.

When the first and second angular tilting ranges are distinct, a continuous tilt of the substrate through the first and second angular tilting ranges produces a particular prominent effect. While the substrate is tilted through the first angular tilting range, the first color movement effect occurs. This first color movement effect in the first motif comes to a stop or disappears totally once the first angular tilting range is left, i.e. the substrate gets tilted beyond the first angular tilting range. In the second angular tilting range, e.g. immediately thereafter or after the angular gap interposed between the two angular tilting ranges was covered, the second motif exhibits the second color effect. This can result in a kind of "jump" effect because the color effect jumps from the first area to the second area when a continuous tilt of the substrate leaves the first angular tilting range and enters the second.

As usually, the term "angular tilting" relates to a tilt between the substantially plane or flat substrate and the viewing direction from which an observer looks to the substrate. The tilt can be embodied by tilting the substrate and keeping the viewing and/or illumination direction constant or by changing the viewing and/or illumination direction at a static substrate. Of course, combinations are possible, too.

In a preferred embodiment, the second area does not only generate a second color in the second motif but generates a second color movement effect which occurs while the substrate gets tilted over the second angular tilting range. A continuous tilt through the first angular tilting range into the second angular tilting range shows then the first color movement effect as long as the tilt is within the first angular tilting range, and a jump to the second color movement effect once the second angular tilting range was entered. If the two angular tilting ranges overlap or are located gapless next to each other, the jump occurs as a cross fading or changes abruptly without gap. If there is an angular gap interposed between the two angular tilting ranges, the gap produces some kind of delay. In this respect it is particularly of advantage, to relate the gap to a gap area between the two areas. This allows to make the "jump speed" identical to the color movement speed in the first area. To obtain such effect, it is of advantage to provide the two areas with a gap area between. Further, a proportion between a size of the first area (in particular measured in a direction towards the second area) and the first angular tilting range equals a similar proportion between a size of the gap area and the interposed angular gap. A difference of not more than 10% is possible while obtaining the same optical effect.

In embodiments, the color movement effect occurs along a straight line connecting the two areas.

In particular embodiments the second area generates not only a second color effect, but a second color movement effect. In the embodiments, in particular the first and second color movement effects are similar or identical Both color movement effects can occur along the mentioned connecting straight line, and in particular in the same direction when the substrate gets tilted over the first and second angular ranges. Then, both color movement effects occur in the same direction, which enhances the impression of a jump. This is of particular impressive effect if the two areas are located along a straight line and the first and second angular tilting ranges are defined in a plane containing the straight line.

Of course, the inventive concept is not limited to two areas. It is equally possible in embodiment to comprise a series of at least three areas including the first and second area, wherein each area of the series exhibits an individual color effect or color movement effect over an individual (e.g. distinct) angular tilting range.

In embodiments, the motifs and the shape of the areas are individual and distinct. In other embodiments the two motifs are abutting to each other or are even interleaved.

The security element can be used to copy protect documents, in particular banknotes, not fully printed banknote papers, ID documents etc. by providing the security element on such copy protected document.

The invention equally relates to a method of manufacturing a security element. This method comprises to provide a substantially flat substrate. On this substrate, distinct first and second areas are structured, wherein the first area is provided with either a micro-mirror structure or a print of magnetically oriented pigments and the second area is provided with the other one of the micro-mirror structure and the print of magnetically oriented pigments. The first area is configured to display a first motif exhibiting a first color movement effect. This color movement effect is to be seen when the substrate gets tilted over a first angular tilting range. The second area is configured similarly to display a second motif exhibiting a second color effect which can be seen within a second angular tilting range. The two tilting ranges are different, e.g. distinct and continuing to each other either gapless or with an angular gap interposed.

Of course, the method can be utilized to manufacture a security element with the above-mentioned features or in the above-mentioned embodiments.

In the following, embodiments of the invention are described with reference to the enclosed drawing which drawings also may disclose inventive features. These embodiments serve explanatory purposes only and should not limit the invention. If embodiments comprise a particular combination of elements or components, the description should not be construed that all of these elements or components are essential to the invention. Other embodiments can, rather, comprise alternative elements or components, less elements or components or additional elements and components. Further, it is possible to combine elements and components of different embodiments.

Modifications and refinements described for a particular embodiment can also be applied to other embodiments disclosed. To avoid unnecessary repetitions, elements corresponding to each other or having the same function in different embodiments may be shown with the same reference numeral in different figures and will not be described a second time.

Figure 2:
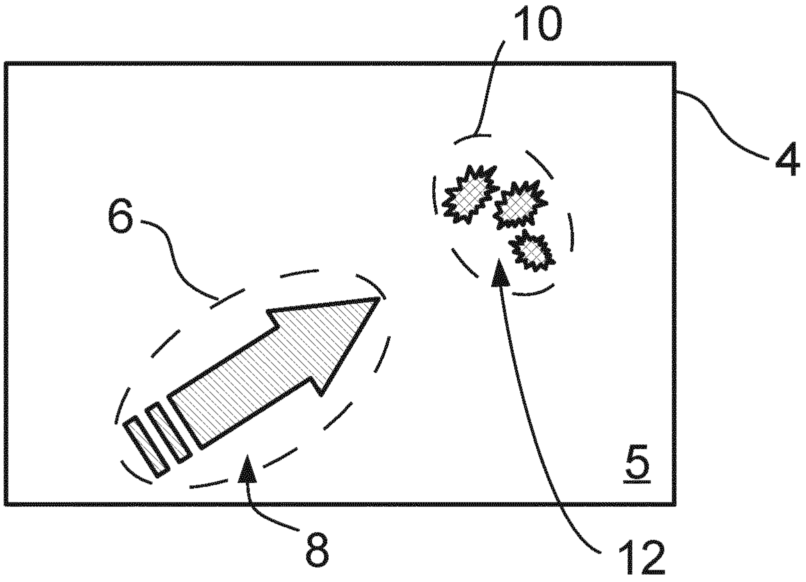
FIG. 2 shows a detailed view of an embodiment of the security element.
Figure 3A:
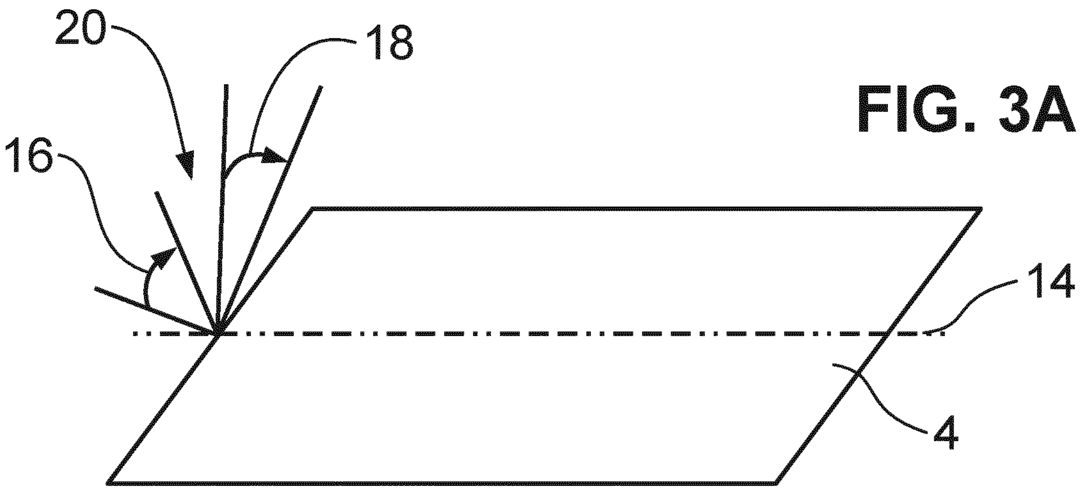
Figure 3B:
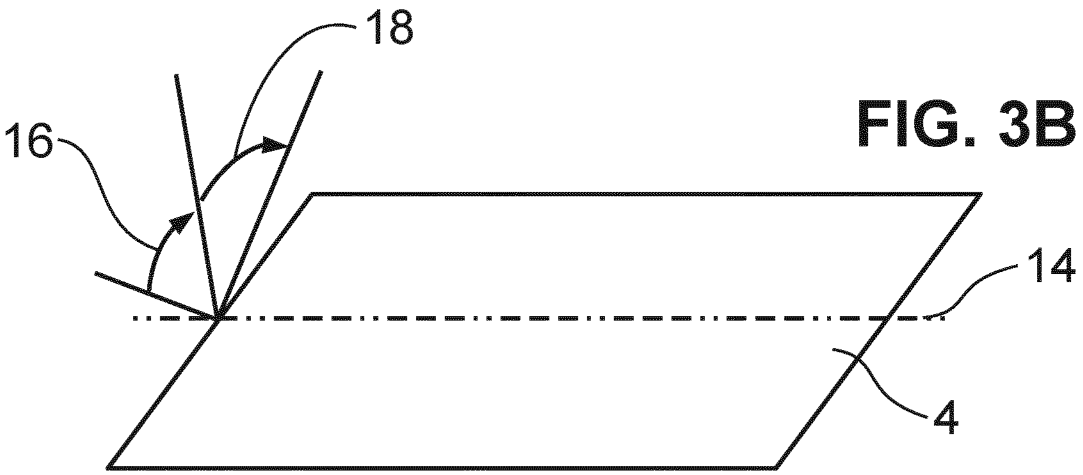
Figure 3C:
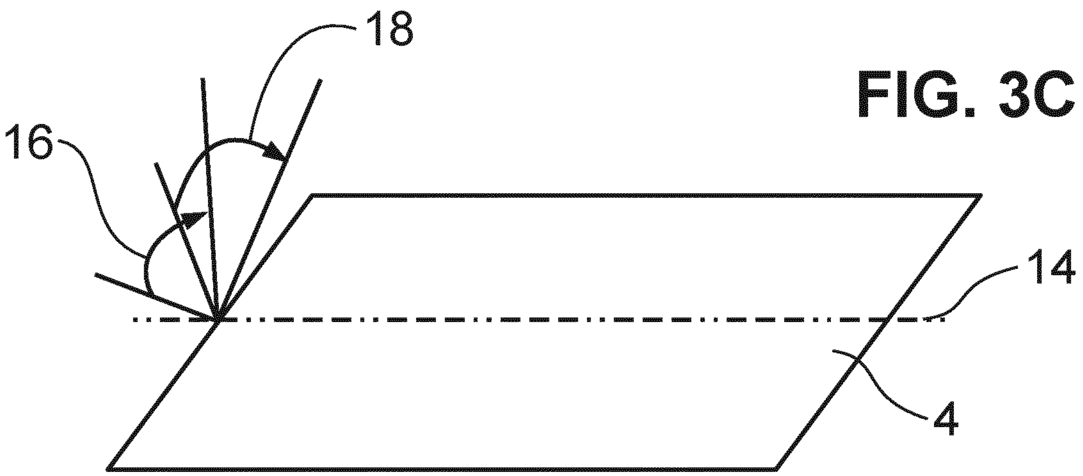

FIGS. 3A-C show a schematic drawing explaining tilting ranges relevant for the security element of FIG. 2, and FIGS. 4A-F show the security element of FIG. 2 in different tilting positions.

Figure 1:
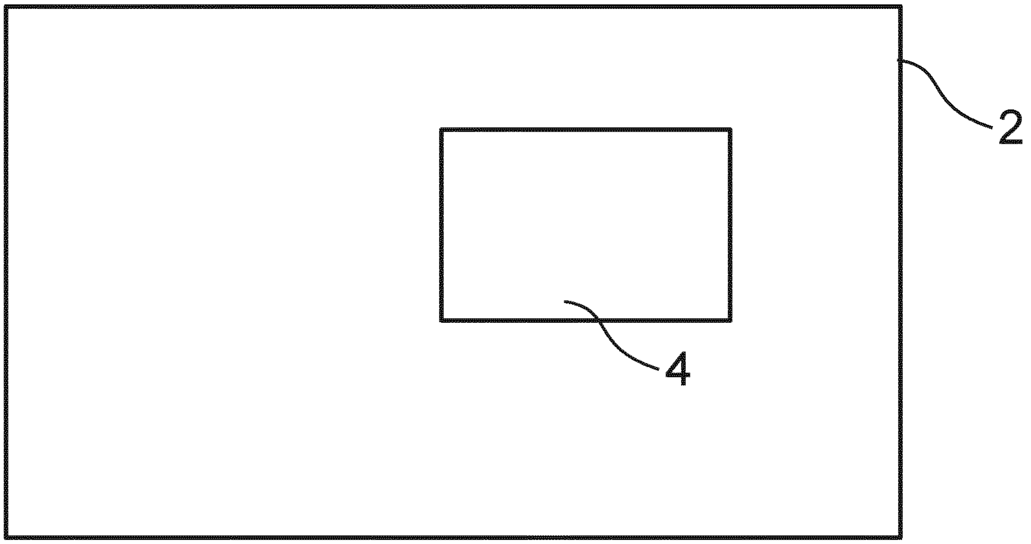
FIG. 1 shows a schematic drawing of a banknote comprising a security element.

FIG. 1 shows a banknote 2 comprising a security element 4. The security element 4 can be produced from a foil by an embossing method and includes sections which are printed with magnetically-oriented pigments and sections comprising micro-mirrors. The security element 4 is shown in an embodiment in FIG. 2 and is applied to a banknote paper by means known to a person skilled in the art. The security element 4 is generated from a flat substrate 5. The security element 4 may also be produced from a foil by an embossing method to provide for the micro-mirrors, and by printing on the substrate 5 (i.e. not on the foil) a layer comprising magnetically oriented pigments.

The areas comprising the micro-mirrors and the magnetically-oriented pigments may be provided with at least one overlaying and laterally structured color layer. In embodiments, this color layer may be a color-shift layer system of design known to a person of ordinary skill in the art. Then a lateral structure of this layer may be dispensed with, because the color-shift system changes its color automatically upon tilting. Hence, manufacturing of such embodiments is particularly simple. A level equalizing layer may be provided between the micro-mirrors and the color-shift layer system.

FIG. 2 shows an enlarged schematic drawing of the security element 4. FIG. 2 shows a view onto the substrate 5. On the substrate 5, there are provided the first area 6 which displays a first motif 8. The security element 4 comprises on the substrate 5 further the second area 10 which displays a second motif 12. For display and generation of the first motif 8, the first area 6 comprises micro-mirrors as known from prior art. The second area 10 comprises a print from magnetically-oriented pigments as equally known from the prior art. The assignment of micro-mirrors and magnetically-oriented pigments in the first and second area 10 can be swapped.

The first and second areas 6, 10 are shown by dashed loops for information purposes only. In fact, most embodiments generate the first and second motifs 8, 12 by first and second areas 8, 10 having the same shape as the corresponding motif.

FIG. 2 shows a plane view of the security element 4 with the two motifs 8, 12. These motifs 8, 12 exhibit color effects when the substrate 5 is tilted. FIG. 3A shows the respective tilting angle definitions for the security element 4—for information purposes without the areas and motifs drawn. In FIG. 3A the security element 4 is shown tilted around an axis 14. A first angular tilting range 16 and a second angular tilting range 18 are identified. Here, they do not adjoin each other, because an angular gap 20 is provided between the first angular tilting range 16 and the second angular tilting range 18. The angular tilting ranges are realized, when the viewing direction to the plane of the substrate is within that range. Obviously, the respective angular conditions can be realized by either tilting the security element 4, as shown in FIG. 3A, or by moving the viewing direction while keeping the security element 4 stable.

FIG. 3B shows a modification without angular gap 20, i.e. the first angular tilting range 16 is immediately continued by the second angular tilting range 18. Further, overlapping first and second angular tilting ranges 16, 18 are an option, as FIG. 3C shows.

The two areas 6, 10 and the two motifs 8, 12 displayed by or in these areas show a color effect which occurs only in one of the two angular tilting ranges. This is achieved by providing the micro-mirrors and the magnetically-oriented pigments in the print with proper elevations as to the angle of light reflection of these mirrors/pigments. For sake of simple explanation, the first angular tilting range 16 is assigned to the first area 6 and the first motif 8 while the second angular tilting range 18 is assigned to the second area 10 and the second motif 12. Of course, this could be inverted.

While the security element 4 is within the first angular tilting range, the first motif 8 shows a first color movement effect. The second motif 12 has no particular color effect while the first substrate 5 is viewed in the first angular tilting range. When the substrate 5 is viewed in a condition according to the second angular tilting range, the first motif 8 does not show the first color movement effect but the second motif 12 shows a second color or, as in the particular embodiment described below with reference to FIG. 4 a second color shift.

Figure 4A:
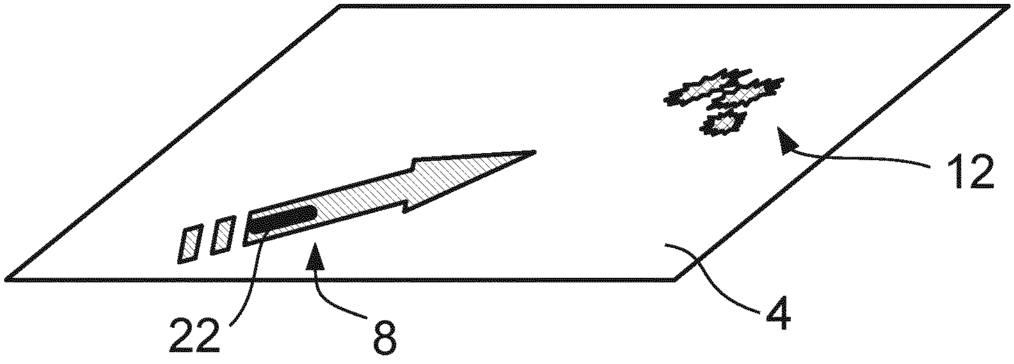
Figure 4B:
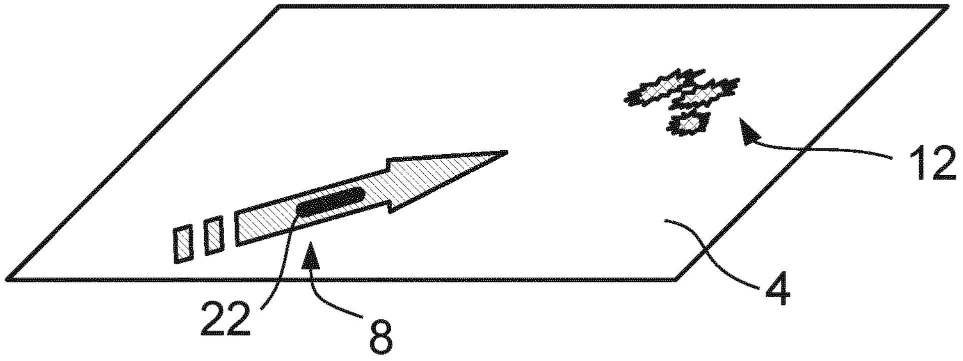
Figure 4C:
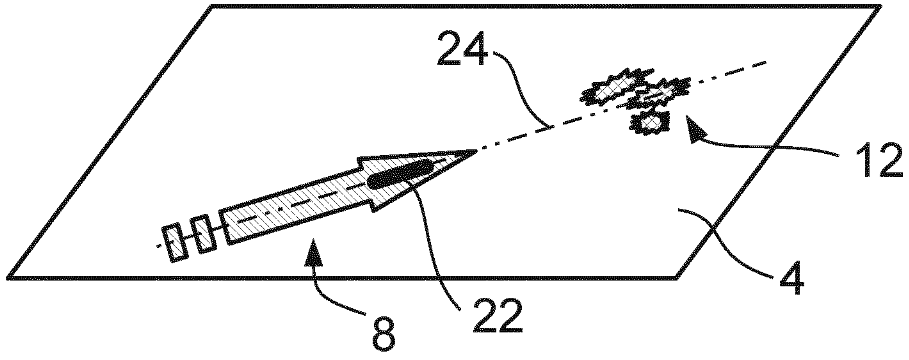
Figure 4D:
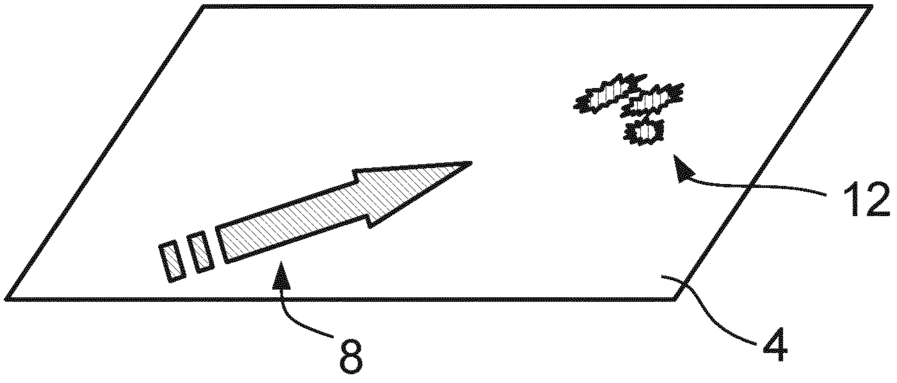
Figure 4E:
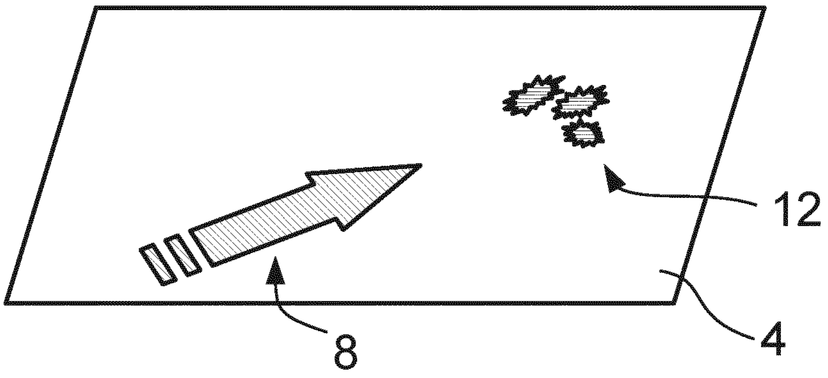
Figure 4F:
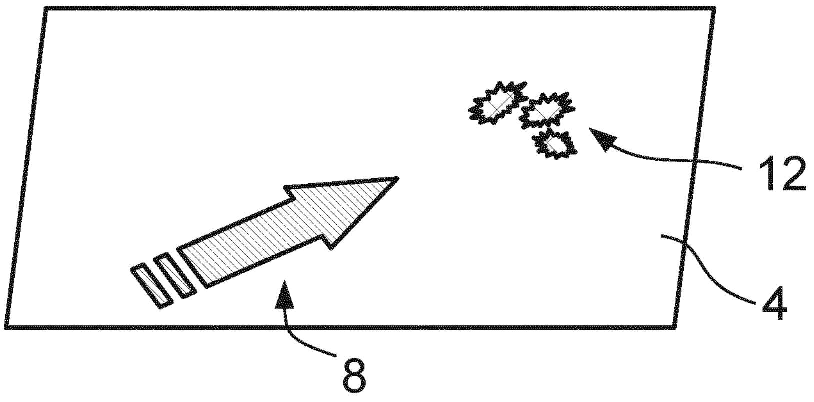

FIGS. 4A-4F show the security element 4 in six different tilting positions. The tilting positions of FIGS. 4A-C are within the first angular tilting range 16 of FIG. 3A or 3B, and FIGS. 4D-F show the security element 4 in three different tilting positions realizing the second angular tilting range 18 of FIG. 3A or 3B. Through FIGS. 4A-4F, the security element 4 is continuously tilted, initially through the first angular tilting range 16 (FIGS. 4A-C) and subsequently through the second angular tilting range 18 (FIGS. 4D-F).

While the security element 4 is tilted through the first angular tilting range 16, the first motif 8 shows a color movement effect 22 symbolized by a moving sub-area, e.g. a line element in FIGS. 4A-C. The line element is brighter than the rest of the motif 8. This is because only for the line element a specular reflection condition, i.e. Snell's Law of reflection, is fulfilled for the particular micro-mirrors or magnetically oriented pigments. Only for these mirrors or pigments, incoming light is reflected towards the observer at the particular tilting orientation. Consequently, the light element 22 is bright. Due to design of the micro-mirrors or magnetically oriented pigments the color generated changes while the line element moves, i.e. the line element in FIG. 3A has a different color than the line element in FIG. 4B. The line element in FIG. 3C has a color different to that of the line element in FIG. 4B. Consequently, the color movement effect 22 comprises both, a change of a bright sub-area in the first area and a change of the color of that bright sub-area. This produces a very prominent effect.

In the embodiment shown, the movement occurs along a straight line 24 connecting the first area 6 and the first motif 8 with the second area 10 and the second motif 12. This is optional. The second motif 12 remains unchanged regarding a color effect as long as the tilting of the security element 4 is outside the (optionally distinct) second angular tilting range 18.

Once the security element 4 is tilted outside the first (and within the second) angular tilting range, the color movement effect does not occur in the first motif 8, but the second motif 12 shows a color effect. FIGS. 4D-F show by different hatchings that the color of the second motif 12 changes when the security element 4 is tilted within the second angular tilting range 18. In its simplest form this color effect is occurrence of one particular color. In embodiments, the color effect comprises a color shift, i.e. changing and/moving colors within the second motif 12. FIGS. 4D-4F symbolize that color shift by three different hatchings shown in the figures for the respective tilting positions.

By that embodiment, FIG. 4 A-F represent over a continuous tilt of the substrate the impression of launch of a rocket first and the resulting fireworks second.

The embodiments makes it easy for untrained observers to understand and verify the security element because the at least two motifs show a jump effect regarding colors in the first motif and the second motif when the first angular tilting range is left and the second angular tilting range is entered. In the embodiment shown in FIG. 4, the color movement effect within the first and/or the second motif. This is one particular embodiment and the invention is not restricted thereto. Examples for motifs used could be the falling of a drop into water and the subsequent occurrence of ripples on the water surface, the firing of the rocket and the subsequent occurrence of fireworks as shown in FIG. 4, the growing of a tree, the falling of an apple, the breaking of a wave, the patching of a bird, sunrise/sunset and moonrise/moonset, the sparking of a flame etc.

The visible area of the security elements depicts a motif, i.e. a certain symbol or image. The reflection within the area generating the first motif is, due to utilization of the micro-mirrors and the magnetically oriented pigments and the first and second area, respectively to provide a dynamic effect upon tilting resembling a characteristic movement or color change.

The invention generates the jump effect between the at least two motifs by tailoring the angular visibility range of the respective dynamic effects or color effects in the motifs by such way that the angular tilting ranges are different, e.g. distinct and do not overlap. The design of the micro-mirror structure and the magnetically oriented pigments can utilize the following aspects: The first area comprises sub-areas $z_1$, $z_2$, . . . $z_i$, and the second area comprises sub-areas $w_1$, $w_2$, . . . $w_j$, the sub-area $z_1$ being adjacent (in direct contact or not in direct contact) to the sub-area $z_2$ and so on. Thus, the sub-area $z_{(i-1)}$ is adjacent to the sub-area $z_i$. The sub-area $w_1$ is adjacent (in direct contact or not in direct contact) to the sub-area $w_2$ and so on. Thus, the sub-area $w_{(j-1)}$ is adjacent to the sub-area $w_j$. The sub-area $z_1$ comprises magnetically oriented pigments having an elevation $\alpha_1$ relative to the substrate surface, the sub-area $z_2$ comprises magnetically oriented pigments having an elevation $\alpha_2$ relative to the substrate surface and so on. Thus, the sub-area $z_i$ comprises magnetically oriented pigments having an elevation $\alpha_i$ relative to the substrate surface. The sub-area $w_j$ comprises oriented mirrors having an elevation $\beta_1$ relative to the substrate surface, the sub-area $w_2$ comprises oriented mirrors having an elevation $\beta_2$ relative to the substrate surface and so on. Thus, the sub-area $w_j$ comprises oriented mirrors having an elevation $\beta_j$ relative to the substrate surface, wherein the distance d between the first area and the second area is d≥0 mm, and the elevations $\alpha_1$ to $\alpha_i$ are strictly monotonic decreasing and all elevations $\beta_1$ to $\beta_j$ are either smaller or bigger than all elevations $\alpha_1$ to $\alpha_i$. These considerations use the magnetically-oriented pigments for the second area and the micro-mirrors for the first area. Of course, this can be inverted.

In embodiments, the second color movement effect may the same as the first color movement effect, i.e. comprise the same CIE parameters that is displayed within the second angular tilting range only, i.e. may be timely shifted or staggered. Such embodiment is particular of advantage if the two areas are interleaved.

Further, it is possible to provide the first and second areas on separate security elements, e.g. transfer elements which are to be applied to a banknote paper etc.

LIST OF REFERENCE NUMERALS

2 banknote
4 security element
5 substrate
6 first area
8 first motif
10 second area
12 second motif
14 axis
16 first angular tilting range
18 second angular tilting range
20 angular gap
22 color movement effect
24 straight line

The invention claimed is:

1. A security element comprising a substantially flat substrate including first and second areas, wherein the first area displays a first motif and generates a first color movement effect to be seen in the first motif while the substrate gets tilted over a first angular tilting range, wherein the first color movement effect produces at least one bright spot moving laterally over the first motif and simultaneously changing color while the substrate gets tilted over the first angular tilting range, the second area displays a second motif and generates a second color movement effect to be seen in the second motif and within a second angular tilting range, wherein the second color movement effect produces at least one bright spot moving laterally over the second motif and simultaneously changing color while the substrate gets tilted over the second angular tilting range, wherein the first and second angular tilting ranges are different, and wherein the first and second color movement effects are identical with respect to CIE color parameters displayed, and the first area comprises either a micro-mirror structure or a print of magnetically oriented pigments and the second area comprises the other one of the micro-mirror structure and the print of magnetically oriented pigments.

2. The security element according to claim 1, wherein the first color movement effect comprises a first color shift.

3. The security element according to claim 1, wherein the first color movement effect occurs in the same direction as the second color movement effect when the substrate gets tilted over the first angular tilting range and—in the same tilting direction—then over the second angular tilting range.

4. The security element according to claim 1, wherein the first angular tilting range overlaps the second angular tilting range by not more than 10%.

5. The security element according to claim 1, the first and second areas each comprising a series of at least three areas, each area of the series exhibiting an individual color movement effect over an individual angular tilting range.

6. The security element according to claim 1, wherein the first area comprises sub-areas $z_1$, $z_2$, . . . $z_i$, and the second area comprises sub-areas $w_1$, $w_2$, . . . $w_j$, wherein each sub-area $z_{(i-1)}$ is adjacent to each sub-area $z_i$ and each subarea $w_{(j-1)}$ is adjacent to each sub-area $w_j$, wherein each sub-area $z_i$ comprises magnetically oriented pigments having an elevation di relative to the substrate surface and each sub-area $w_j$ comprises oriented mirrors having an elevation $\beta_j$ relative to the substrate surface, and wherein the elevations $\alpha_1$ to $\alpha_i$ are strictly monotonic decreasing and all elevations $\beta_1$ to $\beta_j$ are either smaller or bigger than all elevations $\alpha_1$ to $\alpha_i$.

7. The security element according to claim 1, wherein a color-shift layer system is provided overlaying the print.

8. The security element of claim 7, wherein the color-shift layer system overlaying the print also overlays the micro-mirrors and is without lateral structure.

9. The security element of claim 1, wherein further the first area and the second area are disconnected by a gap area provided between the first area and the second area, wherein the first angular range is not overlapping the second angular range.

10. The security element of claim 9, wherein further an angular tilting range gap is interposed between the first angular tilting range and the second angular tilting range, and a proportion between a size of the first area and the first angular tilting range equals a proportion between a size of the gap area and the angular tilting range gap, wherein the sizes of the first area and of the gap area are each measured in a direction from the first area towards the second area.

11. A copy protected document comprising the security element according to claim 1.

12. The copy protected document of claim 11, wherein the copy protected document is a banknote.

13. A method of manufacturing a security element, the method comprising:

providing a substantially flat substrate, structuring first and second areas of the substrate, wherein the first area is provided with either a micro-mirror structure or a print of magnetically oriented pigments and the second area is provided with the other one of the micro-mirror structure and the print of magnetically oriented pigments, configuring the first area to display a first motif and to generate a first color movement effect to be seen in the first motif while the substrate gets tilted over a first angular tilting range, wherein the first color movement effect produces at least one bright spot moving laterally over the first motif and simultaneously changing color while the substrate gets tilted over the first angular tilting range, configuring the second area to display a second motif and to generate a second color movement effect to be seen in the second motif and within a second angular tilting range, wherein the second color movement effect produces at least one bright spot moving laterally over the second motif and simultaneously changing color while the substrate gets tilted over the second angular tilting range, wherein the first and second angular tilting ranges are different, and wherein the first and second color movement effects are identical with respect to CIE color parameters displayed.

14. The method according to claim 13, wherein the first color movement comprises a first color shift.

15. The method according to claim 13, wherein the first color movement effect occurs in the same direction as the second color movement effect when the substrate gets tilted over the first angular tilting range and—in the same tilting direction—then over the second angular tilting range.

16. The method according to claim 13, wherein the first angular tilting range overlaps the second angular tilting range by not more than 10%.

17. The method of claim 13, wherein further the first area and the second area are disconnected by a gap area provided between the first area and the second area, wherein the first angular range is not overlapping the second angular range.

18. The method of claim 17, wherein further an angular tilting range gap is interposed between the first angular range and the second angular tilting range, and a proportion between a size of the first area and the first angular range equals a proportion between a size of the gap area and the angular tilting range gap, wherein the sizes of the first area and of the gap area are each measured in a direction from the first area towards the second area.

* * * * *